United States Patent
Larsson et al.

(10) Patent No.: US 9,532,259 B2
(45) Date of Patent: Dec. 27, 2016

(54) DYNAMIC NETWORK-CONTROLLED FORMATION OF MOBILE CELLS

(71) Applicant: Sony Corporation, Tokyo (JP)

(72) Inventors: Bo Larsson, Lund (SE); Lars Nord, Lund (SE)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 143 days.

(21) Appl. No.: 14/084,968

(22) Filed: Nov. 20, 2013

(65) Prior Publication Data
US 2015/0141025 A1    May 21, 2015

(51) Int. Cl.
| | |
|---|---|
| *H04W 28/02* | (2009.01) |
| *H04W 84/00* | (2009.01) |
| *H04W 24/02* | (2009.01) |
| *H04W 76/02* | (2009.01) |
| *H04W 84/18* | (2009.01) |
| *H04W 84/22* | (2009.01) |

(52) U.S. Cl.
CPC ....... *H04W 28/0226* (2013.01); *H04W 84/005* (2013.01); *H04W 24/02* (2013.01); *H04W 76/023* (2013.01); *H04W 84/18* (2013.01); *H04W 84/22* (2013.01)

(58) Field of Classification Search
CPC ................................................. H04W 28/0226
See application file for complete search history.

(56) References Cited

U.S. PATENT DOCUMENTS

| | | | |
|---|---|---|---|
| 2006/0126524 A1* | 6/2006 | Tateson | 370/252 |
| 2007/0242647 A1* | 10/2007 | Bennett | H04W 88/04 |
| | | | 370/338 |
| 2008/0049688 A1* | 2/2008 | Nakfour et al. | 370/338 |
| 2009/0046678 A1* | 2/2009 | Lee et al. | 370/338 |
| 2010/0074141 A1* | 3/2010 | Nguyen | 370/254 |

(Continued)

FOREIGN PATENT DOCUMENTS

| | | |
|---|---|---|
| WO | 2010006649 A1 | 1/2010 |
| WO | 2013169974 A1 | 11/2013 |

OTHER PUBLICATIONS

Tenhunen, J. et al.: "Stability-Based Multi-Hop Clustering Protocol", Personal, Indoor and Mobile Radio Communications, 2005. PIMRC 2005. IE EE 16th International Symposium on Berlin, Germany Sep. 11-14, 2005, Piscataway, NJ, USA, IEEE, vol. 2, Sep. 11, 2005, pp. 958-962, XP010926360, DOI 10.1109/ PIMRC.2005.1651583, ISBN: 978-978-38007-2-4.

(Continued)

*Primary Examiner* — Mazda Sabouri
(74) *Attorney, Agent, or Firm* — James C. Edwards; Moore & Van Allen PLLC

(57) ABSTRACT

The invention is directed to systems, methods and computer program products for forming a mobile cell in a network. An exemplary method comprises: first determining a first node of the network is within a predetermined distance of a second node of the network; second determining the first node's movement pattern is substantially similar to the second node's movement pattern; forming a mobile cell comprising the first node and the second node based on the first determining and second determining steps; and selecting the first node as a base station for the mobile cell.

14 Claims, 2 Drawing Sheets

(56) References Cited

U.S. PATENT DOCUMENTS

| | | | |
|---|---|---|---|
| 2010/0128653 A1* | 5/2010 | Tateson | 370/315 |
| 2013/0052941 A1* | 2/2013 | Kitaji | H04W 36/08 |
| | | | 455/7 |
| 2014/0003327 A1* | 1/2014 | Seo | H04W 36/08 |
| | | | 370/315 |
| 2014/0092765 A1* | 4/2014 | Agarwal et al. | 370/252 |
| 2014/0192638 A1* | 7/2014 | Taneja | H04W 28/0268 |
| | | | 370/229 |
| 2014/0254468 A1* | 9/2014 | Raaf | H04W 56/003 |
| | | | 370/315 |

OTHER PUBLICATIONS

Aydin, "Document No. ICT-317669-METIS/D4.1 Project Name: Mobile and wireless communications Enablers for the Twenty-twenty Information Society (METIS)", Sep. 30, 2013, pp. 1-97, XP055144276, retreived from the Internet: URL:https://www.metis2020.com/wp-content/uploads/deliverables/METIS_D4.1_v1.pdf [retreived on Oct. 3, 2014].

International Search Report and Written Opinion; Feb. 3, 2015; issued in International Patent Application No. PCT/EP2014/072314.

\* cited by examiner

DYNAMIC NETWORK-CONTROLLED FORMATION OF MOBILE CELLS

BACKGROUND

There are many situations that create unusual load levels on mobile networks. As used herein, an unusual load level is a load level greater than or equal to a predetermined load level. The issue of unusual load levels is not only bandwidth-related; an extraordinary number of attached user equipment (UEs) may also cause unusual load levels. Such situations typically occur when large numbers of people gather for events such as concerts, sports events, demonstrations, festivals, etc.

When these network congestion situations are imminent, the network needs to be able to mitigate the overload. If not, then these situations can lead to total network failure. In traditional mobile networks, operators need to plan ahead of such situations by reconfiguring their network and possibly increase capacity by placing additional base stations near areas associated with potentially unusual load levels.

Manual reconfiguration is of course not desirable, nor even possible in some cases. Therefore, there is a need for a solution to address unusual load levels.

BRIEF SUMMARY

Embodiments of the invention are directed to systems, methods and computer program products for forming a mobile cell in a network. An exemplary method comprises: first determining, using a computing device processor, a first node of the network is within a predetermined distance of a second node of the network; second determining, using a computing device processor, the first node's movement pattern is substantially similar to the second node's movement pattern; forming, using a computing device processor, a mobile cell comprising the first node and the second node based on the first determining and second determining steps; and selecting, using a computing device processor, the first node as a base station for the mobile cell.

In some embodiments, the first determining step is executed based on location data associated with the first node and the second node.

In some embodiments, the second determining step is executed based on movement data associated with the first node and the second node.

In some embodiments, the method further comprises determining at least one of a power status of the first node and a power status of the second node.

In some embodiments, the selecting step is based on determining a power status associated with the first node.

In some embodiments, the selecting step is based on determining a location of the first node with respect to a location of the second node, and based on determining the location of the first node with respect to a location of a base station associated with the network.

In some embodiments, the method further comprises determining at least one of a bandwidth utilization of the first node and a bandwidth utilization of the second node.

In some embodiments, the forming step is based on determining a bandwidth utilization of the first node and a bandwidth utilization of the second node are less than or equal to a predetermined threshold bandwidth utilization.

In some embodiments, the forming step is based on determining or predicting a network load level associated with a particular area being greater than or equal to a predetermined load level.

In some embodiments, the base station of the mobile cell acts as an access point in the network.

In some embodiments, the network comprises a mesh network.

In some embodiments, the network comprises a wireless local area network (WLAN).

In some embodiments, the network comprises a cellular network.

In some embodiments, the node is associated with a device.

In some embodiments, the device comprises at least one of a mobile computing device, a non-mobile computing device, a mobile phone, a television, a watch, or a tablet computing device.

In some embodiments, an apparatus is provided for forming a mobile cell in a network. The apparatus comprises: a memory; a processor; and a module stored in the memory, executable by the processor, and configured to: first determine a first node of the network is within a predetermined distance of a second node of the network; second determine the first node's movement pattern is substantially similar to the second node's movement pattern; form a mobile cell comprising the first node and the second node based on the first determining and second determining steps; and select the first node as a base station for the mobile cell.

In some embodiments, a computer program product is provided for forming a mobile cell in a network. The computer program product comprises a non-transitory computer-readable medium comprising a set of codes for causing a computer to: first determine a first node of the network is within a predetermined distance of a second node of the network; second determine the first node's movement pattern is substantially similar to the second node's movement pattern; form a mobile cell comprising the first node and the second node based on the first determining and second determining steps; and select the first node as a base station for the mobile cell.

BRIEF DESCRIPTION OF THE DRAWINGS

Figure 1:
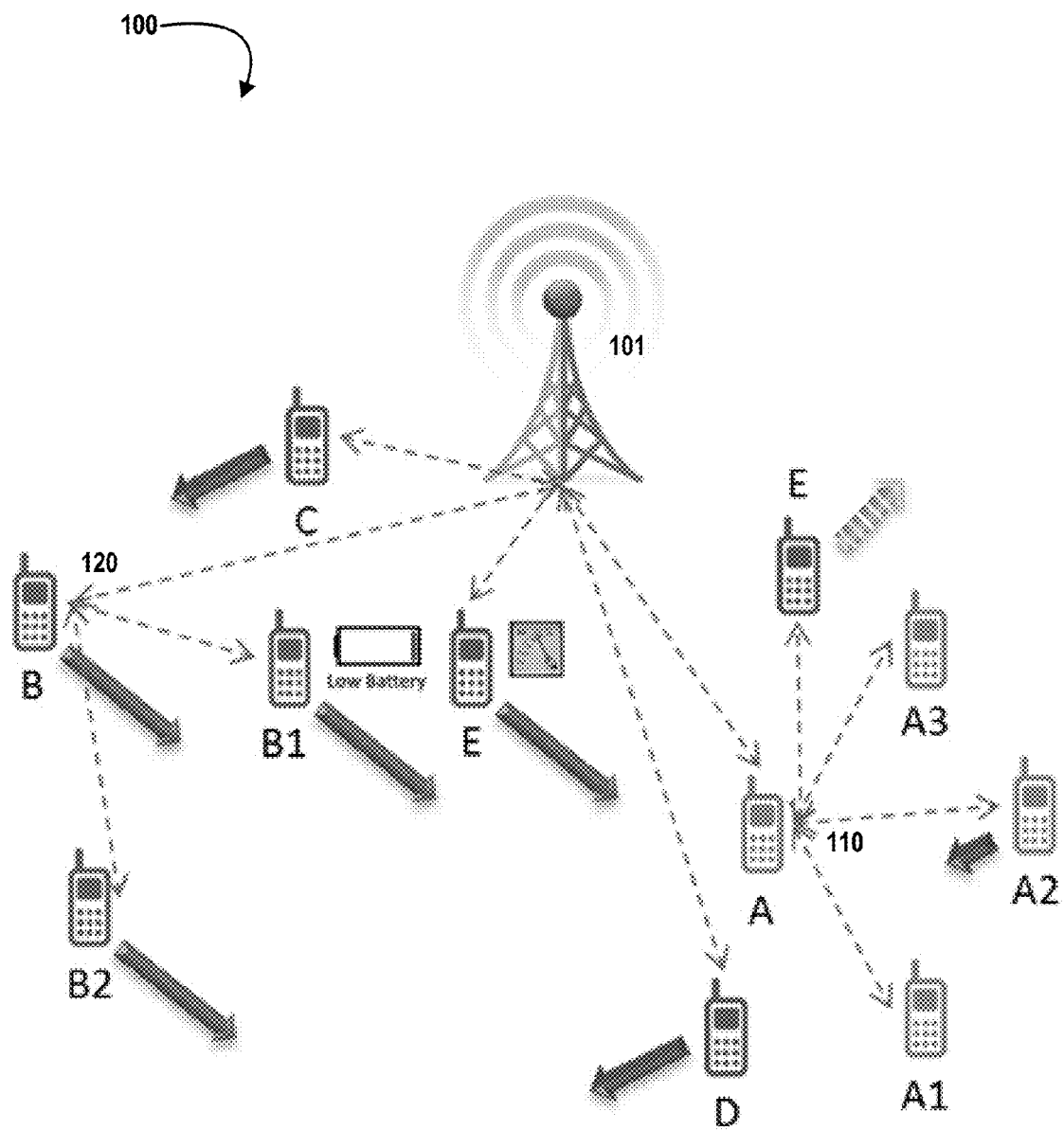
Figure 2:
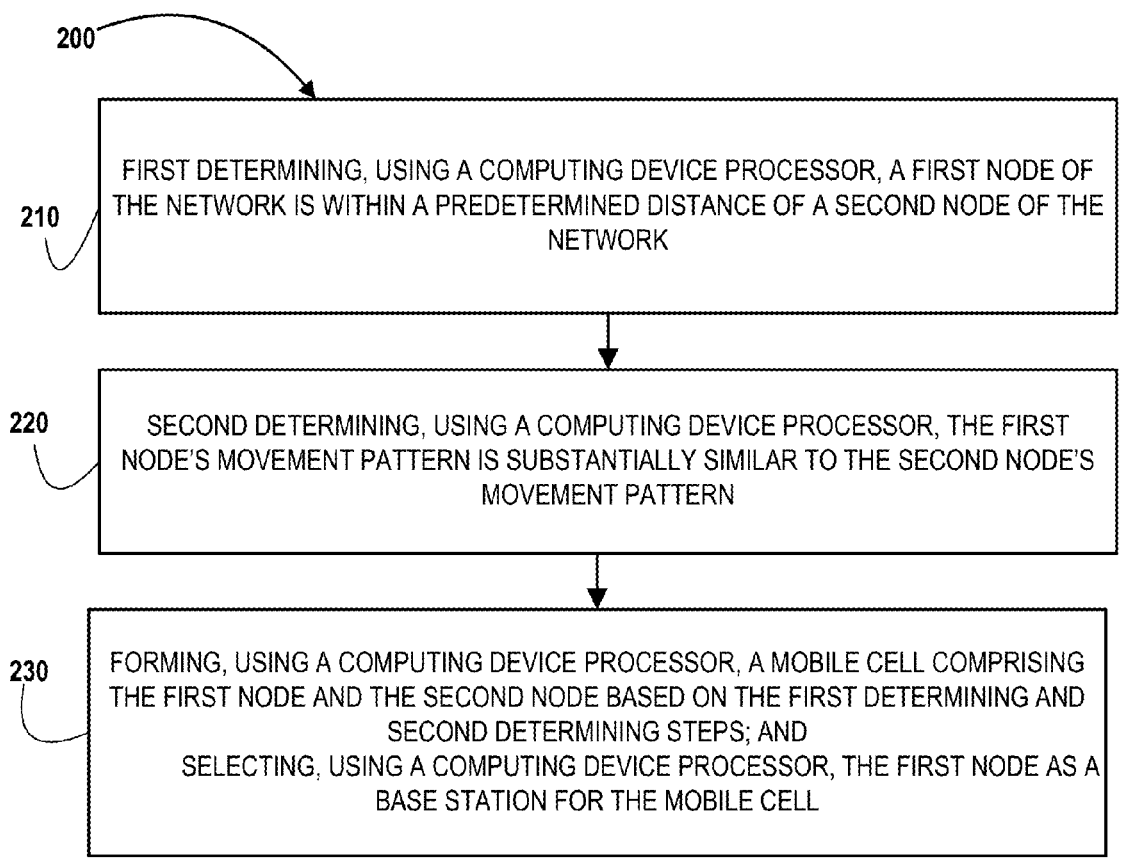

Having thus described embodiments of the invention in general terms, reference will now be made to the accompanying drawings, where:

FIG. 1 is an exemplary network environment, in accordance with embodiments of the present invention; and FIG. 2 is an exemplary process flow for forming a mobile cell in a network, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Devices in wireless networks can be connected in a mesh structure, i.e., one device is connected to one or more other devices in an ad-hoc manner. Each device in a mesh network is referred to as a node. Embodiments of the invention are directed to systems, methods and computer program products for decreasing congestion in a network. As used herein, a network may be a wired or wireless network (e.g., a WLAN). Each device on the mesh network may be connected to one or more other devices. As used herein, a device may be associated with or may also be referred to as a node or as user equipment (UE).

In mobile networks (including evolution of $3^{rd}$ Generation Partnership Project (3GPP) releases and $5^{th}$ Generation (5G) releases), user equipment (UE) may be used as "small cell" base stations, sometimes referred to as moving cells or mobile cells. These cells operate under the control of the larger network. The cells are dynamically created, removed, and reconfigured. The present invention enables the establishment and maintenance of mobile cells. In some embodiments, the present invention is directed to mitigating congestion associated with 3GPP and 5G networks.

This invention provides a novel method that mobile networks can use to avoid congestion by dynamically initiating reformation of the network based on considering current locations, predicted locations, velocities, and the like, of UEs associated with the network. As described herein, when a network is described as performing a function, the network backbone or base station performs the function.

The present invention enables a network (e.g., a network backbone or base station) to instruct UEs to act as mobile base stations in order to distribute/decrease network load. The decision to send instructions to a UE is based on data such as current UE location, its velocity, power data, bandwidth utilization, and optionally predictions on future parameter values associated with the UE. The data on the UE's current state may either be gathered from within the network or signaled from the UE, either with or without being pinged by the network. For example, the UE's gyrometer, accelerometer, compass and/or satellite positioning capabilities (e.g. global positioning system (GPS) capabilities) may be used to provide such data. Predicted future parameter values associated with the UE may be either UE- or network-originated. Additionally, the UE and network use context awareness engines and/or mapping services to obtain the data described herein. In most embodiments, the context awareness engines reside on the UE.

In addition to data from individual UEs, when deciding to send instructions to a UE, the network may also need to consider network topology (relative base station location), possible radio propagation conditions, relative location of UEs, UEs' bandwidth needs, etc. Traditional radio link metrics, such as received signal strength indication (RSSI) metrics associated with UEs, may also be considered.

The data described herein enables the network to predict load conditions that may prove problematic at a predetermined time in the future, and dynamically assign/de-assign UEs to act as mobile base stations, or as access points in a mesh network at predetermined times in the future. In order to improve network efficiency, the present invention also enables a network reconfiguration based on the gathered data.

There are many situations that create unusual load levels on the network. One example is special events, when large numbers of people gather in a very small area (e.g., an area associated with a radius less than or equal to a predetermined radius). In such cases, people travel into a specific area for a period of time. By monitoring the location data and movement of each UE on the network over a period of time, the network can not only determine current load conditions, but also predict extreme load conditions (e.g., load greater than a predetermined load) at a predetermined time in the future (e.g., at 8 AM in the morning and 5 PM in the evening near a particular bus stop or train station).

The network can also determine which UEs are in close proximity (e.g., within a predetermined distance) of each other and create mobile cells based on the determination. FIG. 1 describes the formation of mobile cells.

Referring now to FIG. 1, FIG. 1 displays an exemplary network environment with base station 101. Mobile cell 110 (comprising UEs A, A1, A2, and A3) is formed based on the network (a) determining A, A1, A2, and A3 are proximate to each other (e.g., determining that one or more of the UEs are located at a distance less than or equal to a predetermined distance from one or more of the other UEs), (b) determining A, A1, A2, and A3 share a similar movement pattern (e.g., they are all substantially stationary during a period of time), (c) determining A2 is moving, but is moving towards A at a low speed (e.g., a speed less than or equal to a predetermined speed), (d) determining D is proximate to at least one of A, A1, A2, and A3, but is moving away from A and the mobile cell 110 and hence excluded from the mobile cell 110, and (e) determining E is also proximate to at least one of A, A1, A2, and A3, but predicting that E will move away from the cell within a predetermined period and therefore excluding E from the mobile cell 110. The network selects A as the mobile base station (over A1, A2, and A3) for mobile cell 110 because A is closer to the network base station 101 and/or because A has a higher battery/power level compared to A1, A2, and A3. The power levels are determined by the network based on the network pinging the UEs or based on the UEs periodically communicating their power levels to the network without being pinged by the network.

Mobile cell 120 (comprising UEs B, B1, and B2) is formed based on the network (a) determining B, B1, and B2 are proximate to teach other (e.g., determining that one or more of the UEs are located at a distance less than or equal to a predetermined distance from one or more of the other UEs), (b) determining B, B1, and B2 share a similar movement pattern (e.g., they are all moving in a substantially similar direction at a substantially similar speed because for example, they may be on a moving bus), (c) determining C is proximate to at least one of B, B1, and B2, but is moving in a different direction than mobile cell 120 and hence excluded from the mobile cell 120, and (d) determining E is also proximate to at least one of B, B1 and B2 and is also moving in substantially the same direction as at least one of B, B1, and B2, but determining that E's bandwidth utilization is equal to or greater than a predetermined threshold bandwidth utilization (and/or equal to or greater than bandwidth utilization associated with at least one of B, B1, and B2), and therefore excluding E from the mobile cell 120. The network selects B as the mobile base station (over B1 and B2) for mobile cell 120 because B has a higher battery/power level compared to B1 and B2 even though B is situated further away from the network backbone 101 compared to B1.

As described with respect to FIG. 1, the network forms mobile cells based on the data associated with the UEs as described herein. As described herein, sensor data from the UE may be used. For example, an accelerometer (or other sensor) associated with the UE can determine if the UE is substantially stationary or static (e.g., the change in position or speed of the UE is less than or equal to a predetermined distance or speed).

The data described herein enables the network to dynamically assign a UE to act as a temporary mobile cell base station or a mesh access point (AP) in a mesh network. As used herein, an access point is a specially configured node on a network that acts as a transmitter and receiver of wireless signals, thereby enabling communication between other nodes on the network. The network selects a UE as the mobile cell base station or mesh AP based on at least one of: the location of the selected UE with respect to the network backbone and other UEs (e.g., the selected UE is situated closer to the network backbone compared to other UEs), predicted movement of the UEs in a predetermined area, sensor data associated with the UEs, wherein the sensor data comprises, for example, accelerometer, gyro and satellite navigation data (how static are the UEs), data communication capability and utilization of the UEs (e.g., how many bits/s can they transmit and/or receive), power status of the UEs (e.g., whether a UE is running on battery or is plugged-in, and the amount of power remaining in the UE's battery), etc.

The dynamic formation of mobile cells is possible when the network has access to location data, sensor data, and other data as described herein. As used herein, location data refers to the distance (e.g., physical distance, network distance (how many nodes between the network backbone and the UE), etc.) between the UE and the network backbone, distance between the UEs, and the predicted movement of the UEs with respect to the movement of other UEs and the network backbone.

Referring now to FIG. 2, FIG. 2 describes an exemplary process flow for optimizing a configuration associated with a mesh network. At step 210, the process flow comprises first determining, using a computing device processor, a first node of the network is within a predetermined distance of a second node of the network. At step 220, the process flow comprises second determining, using a computing device processor, the first node's movement pattern is substantially similar to the second node's movement pattern. At step 230, the process flow comprises forming, using a computing device processor, a mobile cell comprising the first node and the second node based on the first determining and second determining steps, and selecting, using a computing device processor, the first node as a base station for the mobile cell.

Each device associated with each node (and the base station) in FIG. 1 includes a processor, a memory, and a module stored in the memory, executable by the processor, and configured to perform the various processes described herein, including the capability to communicate with other devices on the network.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for forming a mobile cell in a network, the method comprising:
    first predicting, using a computing device processor, a first node of the network will be within a predetermined distance of a second node of the network at a predetermined future time, wherein the first and second nodes comprise user equipment;
    second predicting, using a computing device processor, that a movement pattern of the first node will be substantially similar to a movement pattern of the second node at the predetermined future time;
    third predicting, using a computing device processor, that a bandwidth utilization of at least one of the first node and the second node will be less than or equal to a redetermined bandwidth utilization threshold at the predetermined future time;
    forming, using a computing device processor, a mobile cell at the predetermined future time comprising at least the first node and the second node based on (1) the first node of the network being predicted to be within the predetermined distance of the second node at the predetermined future time, (2) the movement pattern of the first node predicted to be substantially similar to the movement pattern of the second node at the predetermined time, and (3) the bandwidth utilization of at least one of the first node and the second node predicted to be less than or equal to the predetermined bandwidth utilization threshold at the predetermined future time; and
    selecting, using a computing device processor, one of the first node or the second node as a mobile base station for the mobile cell.

2. The method of claim 1, wherein the first predicting step is executed based on location data associated with the first node and the second node.

3. The method of claim 1, wherein the second predicting step is executed based on movement data associated with the first node and the second node.

4. The method of claim 1, further comprising predicting at least one of a power status of the first node and a power status of the second node.

5. The method of claim 1, wherein the selecting step is based on determining, at the predetermined future time, a power status associated with the first and second nodes.

6. The method of claim 1, wherein the selecting step is based on (1) determining, at the predetermined future time, a location of the first node with respect to a location of the second node, (2) determining the location of the first node with respect to a location of a base station associated with the network, and (3) determining the location of the second node with respect to the location of the base station associated with the network.

7. The method of claim 1, wherein the forming step is based on predicting a network load level associated with a particular area being greater than or equal to a predetermined load level during the predetermined future time.

8. The method of claim 1, wherein the base station of the mobile cell acts as an access point in the network.

9. The method of claim 1, wherein the network comprises a mesh network.

10. The method of claim 1, wherein the network comprises a wireless local area network (WLAN).

11. The method of claim 1, wherein the network comprises a cellular network.

12. The method of claim 1, wherein the first and second nodes comprise at least one of a mobile computing device, a non-mobile computing device, a mobile phone, a television, a watch, or a tablet computing device.

13. An apparatus for forming a mobile cell in a network, the apparatus comprising:
 a memory;
 a processor; and
 a module stored in the memory, executable by the processor, and configured to:
  first predict a first node of the network will be within a predetermined distance of a second node of the network at a predetermined future time, wherein the first and second nodes comprise user equipment;
  second predict that a movement pattern of the first node will be substantially similar to a movement pattern of the second node at the predetermined future time;
  third predict that a bandwidth utilization of at least one of the first node and the second node will be less than or equal to a predetermined bandwidth utilization threshold at the predetermined future time;
  form a mobile cell at the predetermined future time comprising at least the first node and the second node based on (1) the first node of the network being predicted to be within the predetermined distance of the second node at the predetermined future time, (2) the movement pattern of the first node predicted to be substantially similar to the movement pattern of the second node at the predetermined time, and (3) the bandwidth utilization of the at least one of the first node and the second node predicted to be less than or equal to the predetermined bandwidth utilization threshold at the predetermined future time; and
  select one of the first node or the second node as a mobile base station for the mobile cell.

14. A computer program product for forming a mobile cell in a network, the computer program product comprising:
 a non-transitory computer-readable medium comprising a set of codes for causing a computer to:
  first predict a first node of the network will be within a predetermined distance of a second node of the network at a predetermined future time, wherein the first and second nodes comprise user equipment;
  second predict that a movement pattern of the first node will be substantially similar to a movement pattern of the second node at the predetermined future time;
  third predict that a bandwidth utilization of at least one of the first node and the second node will be less than or equal to a predetermined bandwidth utilization threshold at the predetermined future time;
  form a mobile cell at the predetermined future time comprising at least the first node and the second node based on (1) the first node of the network being predicted to be within the predetermined distance of the second node at the predetermined future time, (2) the movement pattern of the first node predicted to be substantially similar to the movement pattern of the second node at the predetermined time, and (3) the bandwidth utilization of at the least one of the first node and the second node predicted to be less than or equal to the predetermined bandwidth utilization threshold at the predetermined future time; and
 select one of the first node or the second node as a mobile base station for the mobile cell.

\* \* \* \* \*

UNITED STATES PATENT AND TRADEMARK OFFICE
CERTIFICATE OF CORRECTION

PATENT NO. : 9,532,259 B2  Page 1 of 1
APPLICATION NO. : 14/084968
DATED : December 27, 2016
INVENTOR(S) : Bo Larsson and Lars Nord It is certified that error appears in the above-identified patent and that said Letters Patent is hereby corrected as shown below:

In the Claims

Column 8, Line 24, replace "redetermined" with "predetermined".

Signed and Sealed this
Twenty-eighth Day of February, 2017

Michelle K. Lee
*Director of the United States Patent and Trademark Office*